US007926840B1

(12) United States Patent  
Choi (10) Patent No.: US 7,926,840 B1
(45) Date of Patent: Apr. 19, 2011

(54) AIRBAG DEVICE FOR VEHICLES (75) Inventor: Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/758,312

(22) Filed: Apr. 12, 2010

(30) Foreign Application Priority Data

Dec. 1, 2009 (KR) .......................... 10-2009-0117769

(51) Int. Cl.
B60R 21/16 (2006.01)
(52) U.S. Cl. .................................................. 280/730.1
(58) Field of Classification Search .................. 280/729, 280/730.1, 730.2, 732, 743.1, 743.2
See application file for complete search history.

(56) References Cited

U.S. PATENT DOCUMENTS

| | | | | |
|---|---|---|---|---|
| 3,414,292 A | * | 12/1968 | Oldberg et al. | 280/740 |
| 3,606,377 A | * | 9/1971 | Martin | 280/741 |
| 3,733,088 A | * | 5/1973 | Stephenson | 280/730.1 |
| 3,774,936 A | * | 11/1973 | Barnett et al. | 280/730.1 |
| 5,934,701 A | * | 8/1999 | Furukawa | 280/730.1 |
| 6,283,500 B1 | * | 9/2001 | Eckert et al. | 280/730.1 |
| 2003/0218325 A1 | * | 11/2003 | Hasebe et al. | 280/743.2 |
| 2006/0028009 A1 | * | 2/2006 | Hasebe et al. | 280/743.1 |
| 2007/0108753 A1 | * | 5/2007 | Pang et al. | 280/743.2 |
| 2009/0302587 A1 | * | 12/2009 | Thomas | 280/743.2 |

* cited by examiner

Primary Examiner — Paul N Dickson
Assistant Examiner — Robert A Coker
(74) Attorney, Agent, or Firm — Morgan, Lewis & Bockius LLP

(57) ABSTRACT

An airbag device for vehicles, which can be expanded with gas in the event of a vehicle collision and efficiently protects the head a passenger sitting in the rear seat of the vehicle. The airbag device for a vehicle, may include an inflator, and an airbag cushion received in a space defined between a roof panel and a head liner such that the airbag cushion expands downwards with gas supplied from the inflator, thereby protecting a passenger sitting in a rear seat, wherein the airbag cushion includes a concave head seat formed in a rear portion thereof to receive and hold a head of the passenger when the airbag cushion expands.

10 Claims, 6 Drawing Sheets

AIRBAG DEVICE FOR VEHICLES

CROSS-REFERENCE TO RELATED APPLICATIONS

The present application claims priority to Korean Patent Application Number 10-2009-0117769 filed on Dec. 1, 2009, the entire contents of which is incorporated herein for all purpose by this reference.

BACKGROUND OF THE INVENTION

1. Field of the Invention

The present invention relates to an airbag device for vehicles and, more particularly, to an airbag device installed in the roof of a vehicle such that, in the event of a vehicle collision, an airbag cushion of the device expands with gas and protects a passenger sitting in the rear seat of the vehicle.

2. Description of Related Art

The development of airbag devices for vehicles has been concentrated on front airbag devices configured to protect front passengers sitting in front seats.

However, when considering the reality that passengers sitting in rear seats are less likely to wear safety belts compared to front passengers sitting in front seats, it is required to positively develop airbag devices for protecting the passengers.

Figure 5:
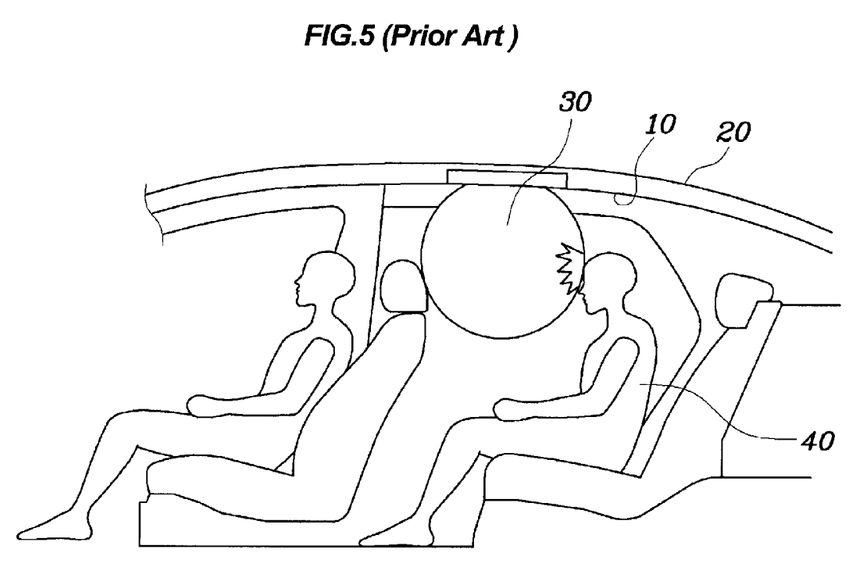
FIG. 5 is a view illustrating the location and function of a conventional airbag device for vehicles.

As shown in FIG. 5, in the related art, an airbag device for protecting a passenger sitting in the rear seat has been proposed. The conventional passenger airbag device is installed in a space between a head liner 10 and a roof panel 20 of a vehicle such that, in the event of a vehicles colliding, an airbag cushion 30 breaks the head liner 10 and expands with gas into the space between a driver's seat and a front passenger seat.

However, in the conventional rear passenger airbag device, the airbag cushion 30 is very quickly inflated just in front of the face of a passenger 40 sitting in the rear seat, so that the passenger may suffer injuries to his/her head and/or neck due to expansion pressure of the airbag cushion 30.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag device for vehicles which can efficiently protect a passenger sitting in the rear seat of the vehicle in the event of a vehicle collision.

In an aspect of the present invention, the airbag device for a vehicle, may include an inflator, and an airbag cushion received in a space defined between a roof panel and a head liner such that the airbag cushion expands downwards with gas supplied from the inflator, thereby protecting a passenger sitting in a rear seat, wherein the airbag cushion includes a concave head seat formed in a rear portion thereof to receive and hold a head of the passenger when the airbag cushion expands.

In another aspect of the present invention, the airbag device may further include a housing installed in the space defined between the roof panel and the head liner and the airbag cushion is received in the housing.

The airbag cushion may include a roof support provided at an upper front portion of the airbag cushion to protrude forwards in a predetermined distance during expansion of the airbag cushion, thus being supported by the head liner, the concave head seat formed inclined downwards in a rearward direction of the vehicle in the rear portion of the airbag cushion such that the concave head seat becomes gradually deeper and then shallower, and shoulder supports protruding rearwards from both sides of the concave head seat to support shoulders of the passenger.

An airbag mounting part may be coupled to an upper portion of the airbag cushion and receives the gas from the inflator to supply the gas to the airbag cushion.

The roof support may extend from the airbag mounting part such that the roof support protrudes forwards in a predetermined distance during expansion of the airbag cushion, thus being supported by the head liner.

The concave head seat may be inclined downwards in a rearward direction of the vehicle from a rear edge of the airbag mounting part to a rear bottom portion of the airbag cushion.

An airbag screen may be attached to both of the shoulder supports and covers the concave head seat.

A front portion of the airbag cushion extending from the roof support may be bent downwards in a rearward direction of the vehicle such that, when the airbag cushion expands, the airbag cushion can be prevented from being interfered with by a front seat.

The airbag cushion may further include at least a tether horizontally arranged in the airbag cushion, wherein the at least a tether is sewn at front and lateral side edges thereof to front and lateral side portions of the airbag cushion and is sewn at a rear edge thereof to the concave head seat, and wherein the at least a tether includes an upper tether and a lower tether, which are arranged at upper and lower locations spaced apart from each other in the airbag cushion.

The above-mentioned airbag devices for vehicles according to the present invention is advantageous in that, when the airbag cushion expands with gas, the concave head seat of the airbag cushion reliably captures and safely holds the head of the passenger, so that the airbag cushion can efficiently absorb impact applied to the head of the passenger due to expansion pressure during the expansion of the airbag cushion.

Particularly, the airbag device of the present invention is also advantageous in that the device minimizes impact, which is easily applied to the head of a rear passenger when the airbag cushion captures the rear passenger, thus minimizing the impact imposed on the head and reducing damage to the passenger and preventing the head of the passenger from being unexpectedly bent by expansion process of the airbag cushion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
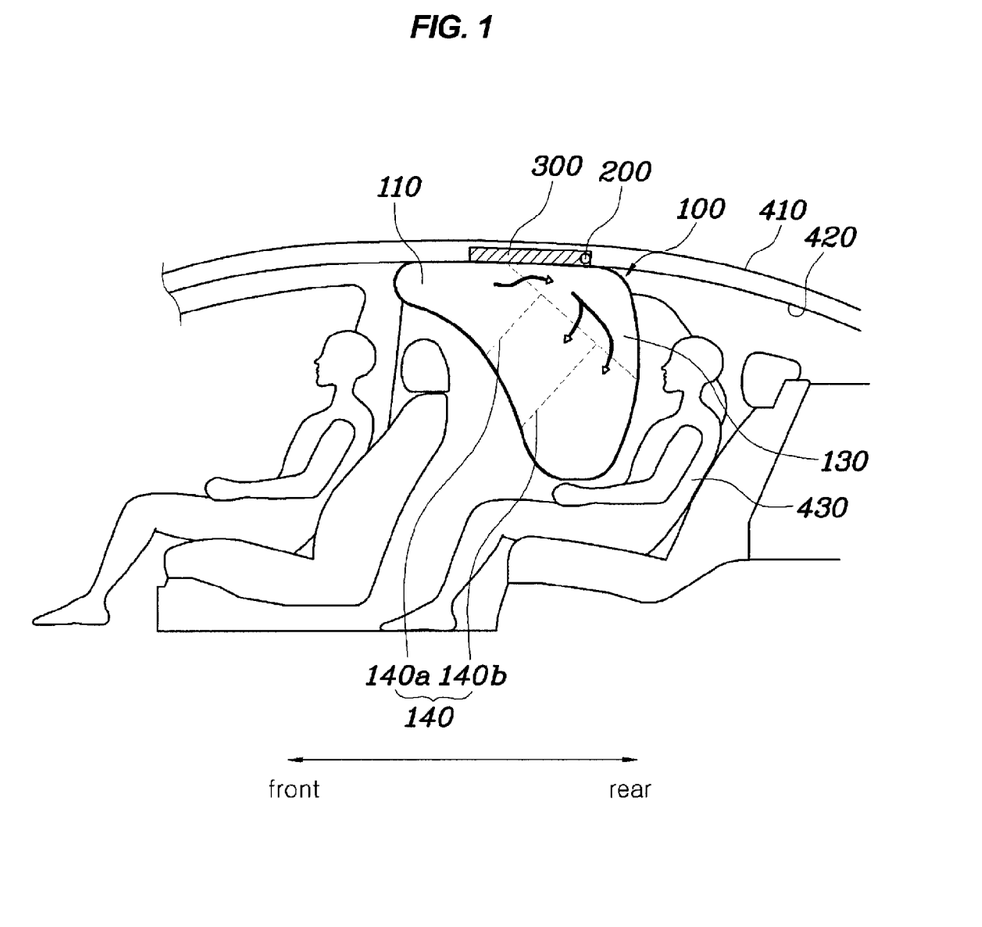
FIG. 1 is a view illustrating the location and function of an exemplary airbag device for vehicles according to the present invention.
Figure 2:
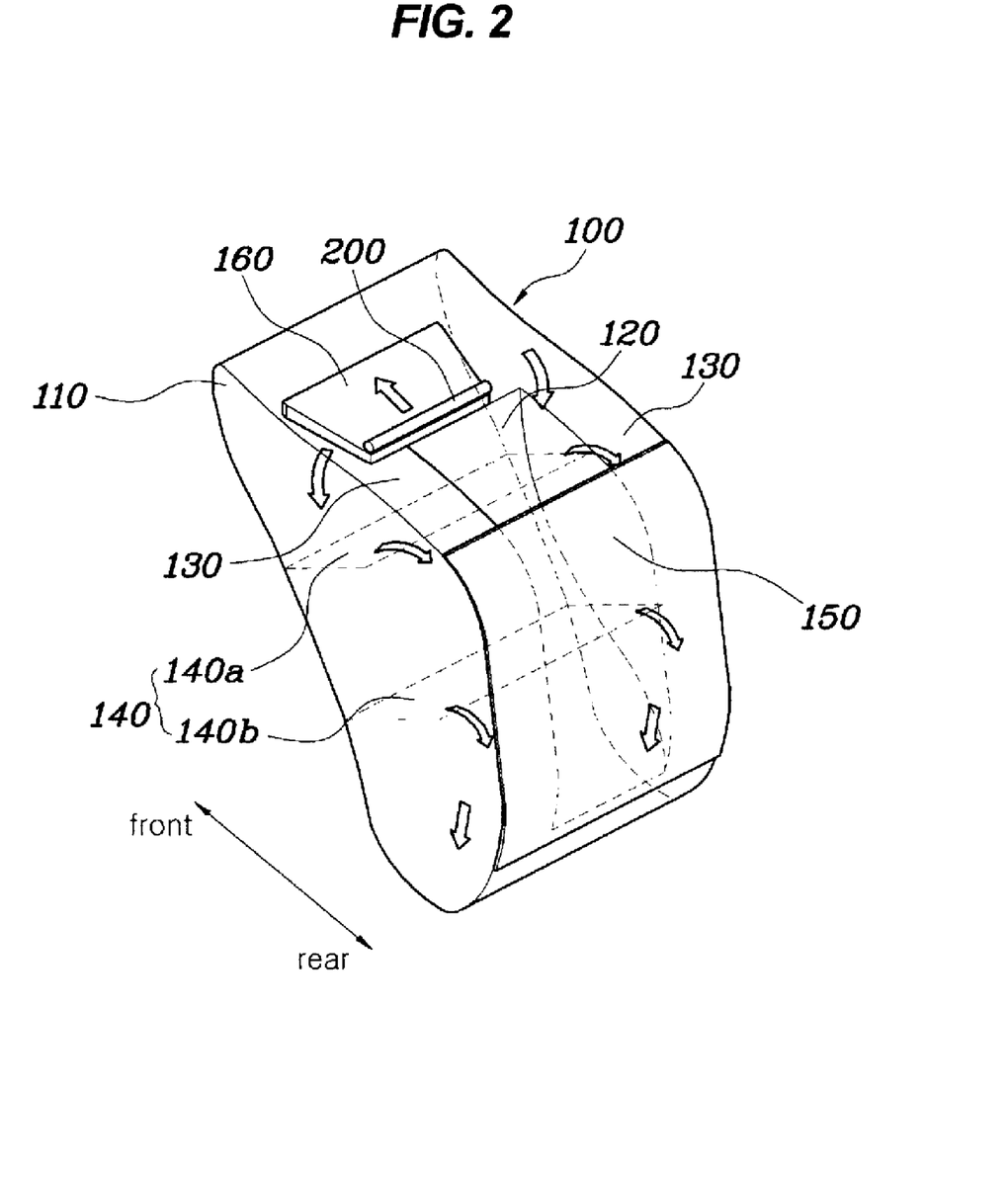
FIG. 2 is a view illustrating an airbag cushion of the exemplary airbag device for vehicles according to the present invention.

FIG. 1 is a view illustrating the location and function of an exemplary airbag device for vehicles according to the present invention. FIG. 2 is a view illustrating an airbag cushion of the exemplary airbag device according to the present invention.

As shown in FIG. 1 and FIG. 2, the airbag device according to an exemplary embodiment of the present invention includes a housing 300, which is installed in a space defined between a roof panel 410 and a head liner 420, and an airbag cushion 100, which can downwardly expand with gas supplied from an inflator 200 in the event of a vehicle collision and protects a passenger 430 sitting in the rear seat while preventing expansion impact thereof from being applied to the head of the passenger.

Described in detail, the inflator 200 functions to supply gas to the airbag cushion 100 in the event of a vehicle collision. In the exemplary embodiment, the inflator 200 is installed in the housing 300. However, it should be understood that the inflator 200 may be installed in the space between the roof panel 410 and the head liner 420 without using the housing.

The housing 300 is installed in the space between the roof panel 410 and the head liner 420. Here, the lower surface of the housing 300 may be covered with the head liner 420 or may be exposed outside the head liner 420 to the passenger compartment.

When the lower surface of the housing 300 is covered with the head liner 420, the head liner 420 is provided with a tear line for allowing the airbag cushion 100 to tear the head liner 420 during expansion. When the housing 300 is exposed outside the head liner 420 to the passenger compartment, an airbag door for ejecting the airbag cushion 100 is provided in the lower surface of the housing 300.

The airbag cushion 100 can expand downwardly with gas supplied from the inflator 200 in the event of a vehicle collision. In order to protect the head of a passenger 430 sitting in the rear seat from expansion pressure during expansion of the airbag cushion 100, the airbag cushion 100 is configured as follows.

The airbag cushion 100 includes an airbag mounting part 160, which is mounted to the housing 300 and primarily receives the gas from the inflator 200. In a normal state, the airbag mounting part 160 receives therein the airbag cushion 100 in a folded state, and, in the event of a vehicle collision, the airbag mounting part 160 functions as a gas passage guiding the gas from the inflator 200 into the entire part of the airbag cushion 100.

The airbag cushion 100 further includes a roof support 110, which is provided at the upper portion of the airbag cushion 100 and protrudes forwards during expansion of the airbag cushion 100. When the airbag cushion 100 expands downwards, the roof support 110 protrudes forwards and is supported by the head liner 420. In the above state, it is preferred that the upper surface of the roof support 110 be brought into surface contact with the head liner 420, so that the roof support 110 can reliably support the airbag cushion 100 relative to the head liner 420 with an increased bearing force.

The airbag cushion 100 further includes a concave head seat 120 for safely holding the head of a passenger 430 sitting in the rear seat in the event of a vehicle collision. The concave head seat 120 is shaped as a concave seat formed in the rear portion of the airbag cushion 100 such that the shape of the head seat corresponds to the shape of the head of the passenger 430 sitting in the rear seat. Therefore, when the airbag cushion 100 expands with gas, the head of the passenger 430 sitting in the rear seat can be safely held in the concave head seat 120 without being damaged by expansion impact, which may be applied to the head of the passenger by expansion pressure of the airbag cushion 100.

The concave head seat 120 is inclined downwards and rearwards in the rear portion of the airbag cushion 100 such that it becomes gradually deeper and shallower in the rearward direction of the vehicle. The above-mentioned shape of the concave head seat 120 is such that it corresponds to the contour formed by the head and neck of the passenger 430 sitting in the rear seat. Thus, the concave head seat 120 can safely protect the head and neck of the passenger 430 sitting in the rear seat in the event of a vehicle collision.

The airbag cushion 100 further includes shoulder supports 130 for supporting the shoulders of passenger 430 sitting in the rear seat in the event of a vehicle collision. The shoulder supports 130 are configured such that, when the airbag cushion 100 expands, the shoulder supports 130 protrude rearwards at respective locations corresponding to the shoulders of the passenger 430 sitting in the rear seat, with the concave head seat 120 defined between the shoulder supports 130. Thus, when the head of the passenger 430 sitting in the rear seat is held in the concave head seat 120, the airbag cushion 100 safely supports the shoulders of the passenger 430 sitting in the rear seat due to the shoulder supports 130.

In the airbag cushion 100, a tether 140 for maintaining the shape of the inflated airbag cushion 100 is provided. To attach the tether 140 having a rectangular shape to the airbag cushion 100, the front edge of the tether 140 is sewn to the front part of the airbag cushion 100 and opposite side edges of the tether 140 are sewn to opposite side parts of the airbag cushion 100. Further, the rear edge of the tether 140 is sewn to the concave head seat 120 of the airbag cushion 100.

The tether 140 includes an upper tether 140a and a lower tether 140b, which are arranged at upper and lower locations spaced apart from each other in the airbag cushion 100. Particularly, the upper tether 140a guides the gas flowing from the inflator 200 to the shoulder supports 130 of the airbag cushion 100, so that the shoulders of the passenger 430 sitting in the rear seat can be quickly and safely supported by the shoulder supports 130 and the head of the passenger 430 sitting in the rear seat can be efficiently held in the concave head seat 120 in the initial stage of expansion of the airbag cushion 100. The lower tether 140b guides the gas flowing from the inflator 200 to the lower portion of the shoulder supports 130 of the airbag cushion 100.

In the exemplary embodiment, the front part of the airbag cushion 100 is specifically bent downwards in the rearward direction of the vehicle such that, when the airbag cushion 100 expands, the airbag cushion 100 can be prevented from interference with an associated front seat. The above-mentioned shape of the front part of the airbag cushion 100 corresponds to a trace formed by a headrest of the front seat when the back of the front seat is tilted forwards and backwards, thus realizing smooth expansion of the airbag cushion 100.

Figure 3A:
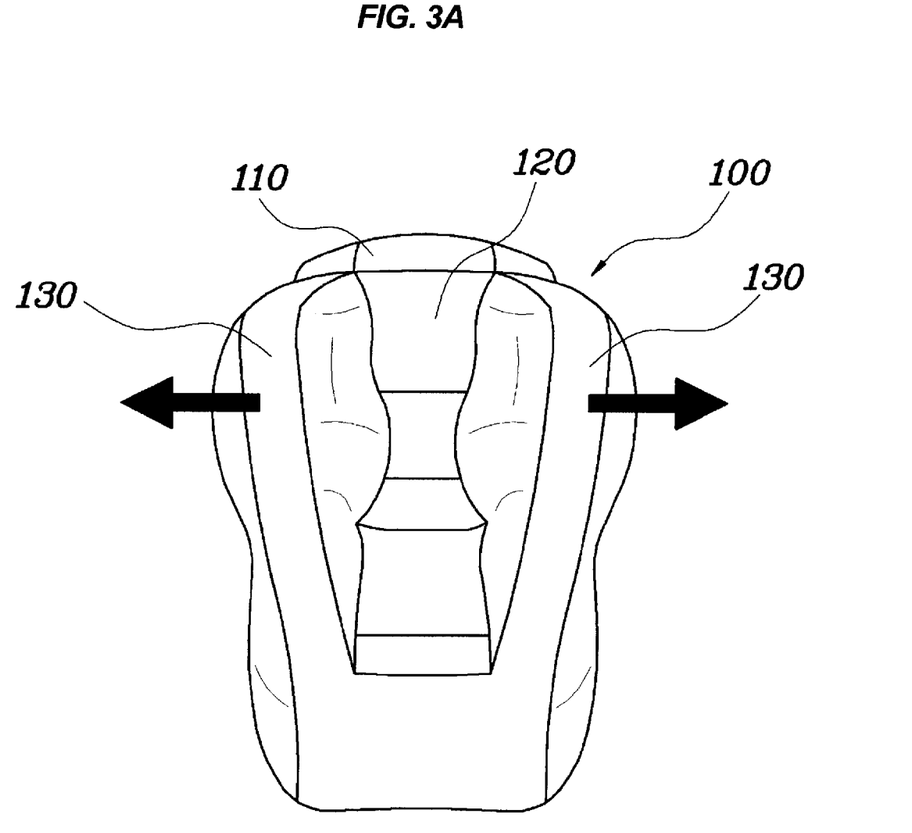
FIG. 3A is a view illustrating a state in which an airbag screen is removed from the airbag cushion of the exemplary airbag device for vehicles according to the present invention.
Figure 3B:
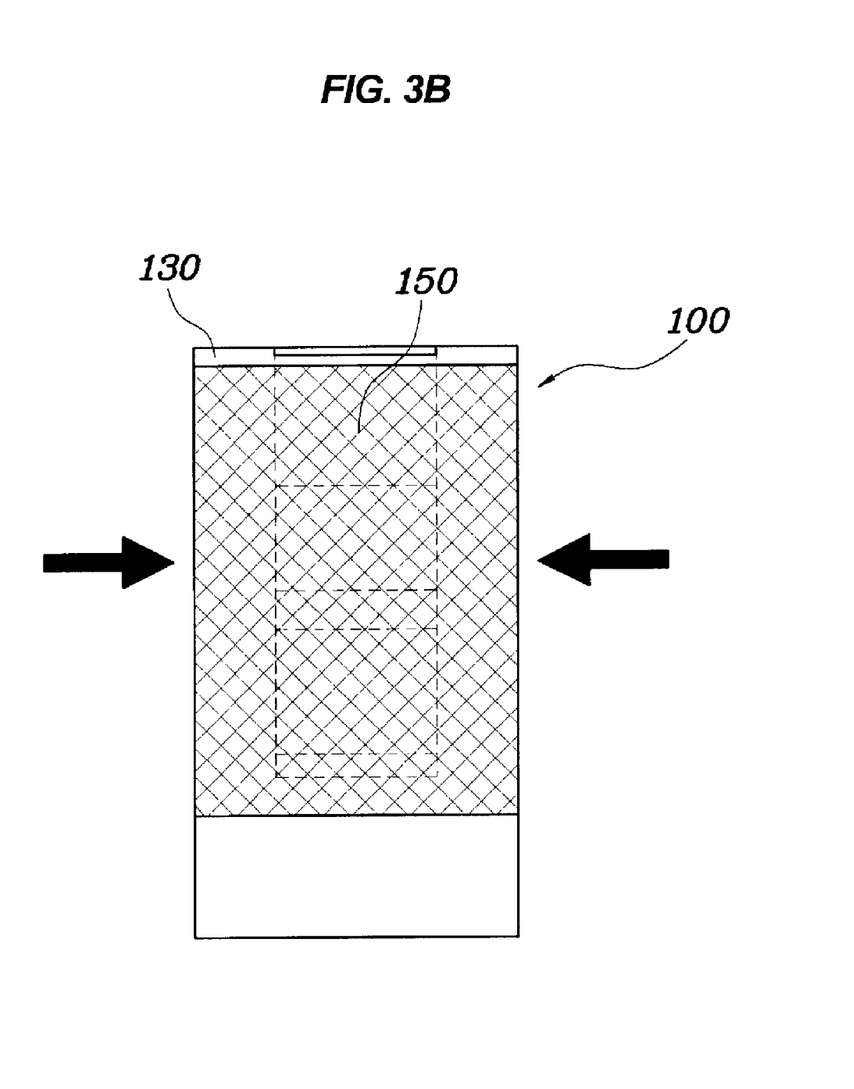
FIG. 3B is a view illustrating a state in which the airbag screen is attached to the airbag cushion of the exemplary airbag device for vehicles according to the present invention.

FIG. 3A is a view illustrating a state in which an airbag screen is removed from the airbag cushion of the exemplary airbag device for vehicles according to the present invention. FIG. 3B is a view illustrating a state in which the airbag screen is attached to the airbag cushion of the exemplary airbag device for vehicles according to the present invention.

As shown in FIG. 2 and FIG. 3B, the airbag device according to the exemplary embodiment has an airbag screen 150, which is attached to the shoulder supports 130 such that the screen 150 covers the concave head seat 120.

In other words, when the airbag screen 150 is not attached to the shoulder supports 130 as shown in FIG. 3A, the shoulder supports 130 do not have desired rigidity, so that when the airbag cushion 100 expands with gas, the shoulder supports 130 may be undesirably opened to the left and right based on the concave head seat 120.

However, when the airbag screen 150 is attached to the shoulder supports 130 as shown in FIG. 3B, the shoulder supports 130 have desired rigidity due to the airbag screen 150, so that the shoulder supports 130 can be prevented from opening to the left and right.

Therefore, when the airbag cushion 100 expands with gas in the event of a vehicle collision, the face of the passenger 430 sitting in the rear seat can be safely held in the concave head seat 120 while being covered with the airbag screen 150. Thus, when the airbag cushion 100 expands with the gas, the airbag cushion 100 efficiently and reliably absorbs impact, which may be applied to the head of the passenger 430 sitting in the rear seat.

Figure 4:
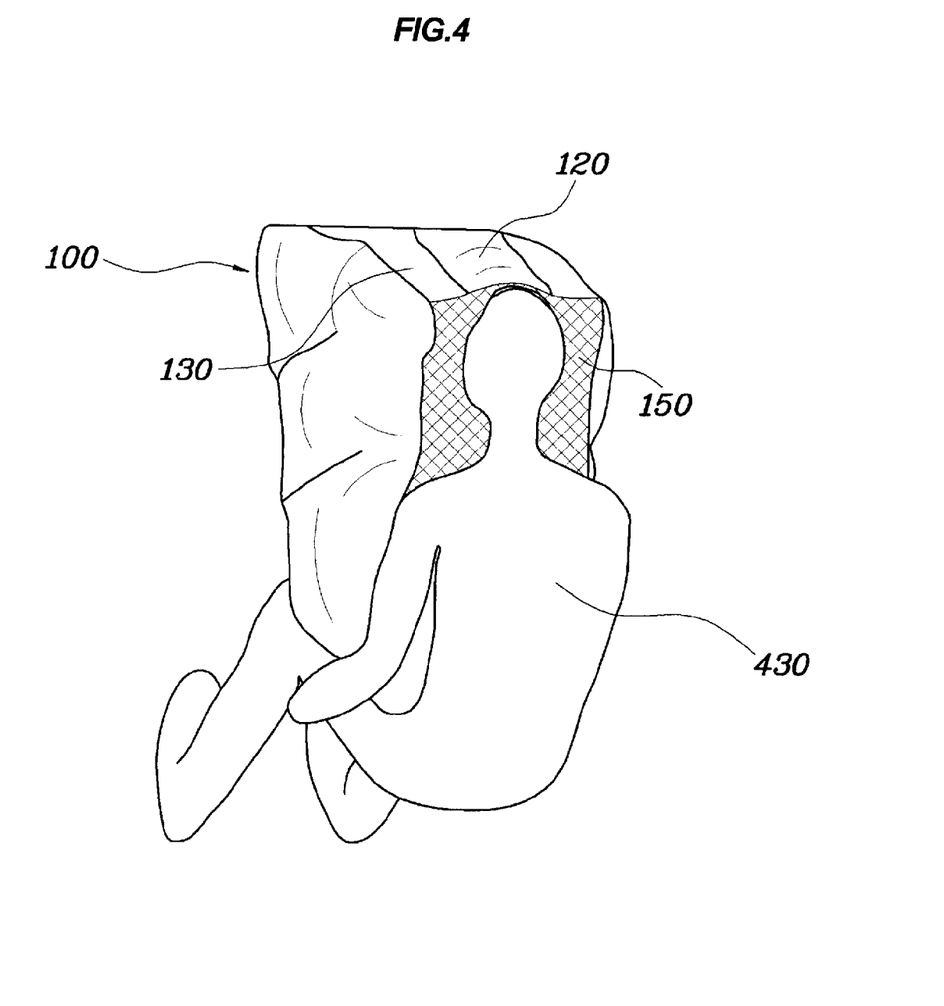
FIG. 4 is a view illustrating a state in which a passenger is supported by the airbag cushion of the exemplary airbag device for vehicles according to the present invention.

FIG. 4 is a view illustrating a state in which a passenger is protected by the airbag cushion of the exemplary airbag device according to the present invention.

As shown in FIG. 4, when the airbag cushion 100 expands with gas in the event of a vehicle collision, the head of the passenger 430 sitting in the rear seat can be safely held in the concave head seat 120 of the airbag cushion 100 in the initial stage of expansion of the airbag cushion 100. Thus, the airbag cushion 100 can efficiently absorb impact energy and efficiently prevents damage to the neck of the passenger 430 sitting in the rear seat.

For convenience in explanation and accurate definition in the appended claims, the terms "upper", "lower" "front", and "mar" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag device for a vehicle comprising:
   an inflator; and
   an airbag cushion received in a space defined between a roof panel and a head liner such that the airbag cushion expands downwards with gas supplied from the inflator, thereby protecting a passenger sitting in a rear seat, wherein the airbag cushion includes a concave head seat formed in a rear portion thereof to receive and hold a head of the passenger when the airbag cushion expands; and
   a housing installed in the space defined between the roof panel and the head liner and the airbag cushion is received in the housing;
   wherein the airbag cushion comprises:
      a roof support provided at an upper front portion of the airbag cushion to protrude forwards in a predetermined distance during expansion of the airbag cushion, thus being supported by the head liner;
      the concave head seat formed inclined downwards in a rearward direction of the vehicle in the rear portion of the airbag cushion such that the concave head seat becomes gradually deeper and then shallower; and
      shoulder supports protruding rearwards from both sides of the concave head seat to support shoulders of the passenger.

2. The airbag device for a vehicle as set forth in claim 1, wherein an airbag mounting part is coupled to an upper portion of the airbag cushion and receives the gas from the inflator to supply the gas to the airbag cushion.

3. The airbag device for a vehicle as set forth in claim 2, wherein the roof support extends from the airbag mounting part such that the roof support protrudes forwards in a predetermined distance during expansion of the airbag cushion, thus being supported by the head liner.

4. The airbag device for a vehicle as set forth in claim 2, wherein the concave head seat is inclined downwards in a rearward direction of the vehicle from a rear edge of the airbag mounting part to a rear bottom portion of the airbag cushion.

5. The airbag device for a vehicle as set forth in claim 1, wherein an airbag screen is attached to both of the shoulder supports and covers the concave head seat.

6. The airbag device for a vehicle as set forth in claim 1, wherein a front portion of the airbag cushion extending from the roof support is bent downwards in a rearward direction of the vehicle such that, when the airbag cushion expands, the airbag cushion can be prevented from being interfered with by a front seat.

7. The airbag device for a vehicle as set forth in claim 1, wherein the airbag cushion further comprises at least one tether horizontally arranged in the airbag cushion.

8. The airbag device for a vehicle as set forth in claim 7, wherein the at least one tether is sewn at front and lateral side edges thereof to front and lateral side portions of the airbag cushion and is sewn at a rear edge thereof to the concave head seat.

9. The airbag device for a vehicle as set forth in claim 7, wherein a plurality of tethers include an upper tether and a lower tether, which are arranged at upper and lower locations spaced apart from each other in the airbag cushion.

10. An airbag device for a vehicle, comprising:
   an inflator; and
   an airbag cushion received in a space defined between a roof panel and a head liner such that the airbag cushion expands downwards with gas supplied from the inflator, thereby protecting a passenger sitting in a rear seat, wherein the airbag cushion includes:
      a concave head seat formed inclined downwards in a rearward direction of the vehicle in a rear portion of the airbag cushion to receive and hold a head of the passenger when the airbag cushion expands;
      a roof support provided at an upper front portion of the airbag cushion to protrude forwards in a predetermined distance during expansion of the airbag cushion, thus being supported by the head liner;
      shoulder supports protruding rearwards from both sides of the concave head seat to support shoulders of the passenger; and
      an airbag screen attached to both of the shoulder supports and covering the concave head seat.

* * * * *